United States Patent [19]

Abramovitz et al.

[11] Patent Number: 4,566,760
[45] Date of Patent: Jan. 28, 1986

[54] MULTI-PRODUCT ACOUSTO-OPTIC TIME INTEGRATING CORRELATOR

[75] Inventors: Irwin J. Abramovitz; Norman J. Berg, both of Baltimore, Md.; Michael W. Casseday, Washington, D.C.

[73] Assignee: The United States of America as represented by the Secretary of the Army, Washington, D.C.

[21] Appl. No.: 599,365

[22] Filed: Apr. 12, 1984

[51] Int. Cl.[4] .......................... G02F 1/33; G06G 9/00
[52] U.S. Cl. ..................................... 350/358; 364/822
[58] Field of Search ............... 350/358, 364, 371, 373; 364/822

[56] References Cited

U.S. PATENT DOCUMENTS

| 4,110,016 | 8/1978 | Berg et al. | 350/358 |
| 4,124,280 | 11/1978 | Berg et al. | 350/358 |
| 4,124,281 | 11/1978 | Berg et al. | 350/358 |
| 4,139,277 | 2/1979 | Berg et al. | 350/358 |
| 4,326,778 | 12/1983 | Berg et al. | 350/358 |
| 4,421,388 | 4/1982 | Berg et al. | 350/358 |
| 4,426,134 | 1/1984 | Abramovitz et al | 350/358 |

OTHER PUBLICATIONS

Berg et al., "A New Single AO Element Two-Dimensional Signal Processor", Paper Presented at the IEEE Ultrasonics Symposium, 11-2-83, Atlanta, GA.

Primary Examiner—William H. Punter
Attorney, Agent, or Firm—Saul Elbaum; Harry Lupuloff; Anthony T. Lane

[57] ABSTRACT

A device for processing signals to obtain a multi-product, time integrated, correlated output signal. A laser light beam is expanded and shaped into a sheet beam which is directed across the surface of an acousto-optic medium. Four acoustic transducers are disposed on the acousto-optic medium, two at each end of the medium. Each acoustic transducer is supplied with a signal to be propagated on the surface of the acousto-optic medium. The first two signals diffract the sheet beam to produce a first, product diffracted beam of light containing the product of the first two signals. The second two signals diffract the sheet beam to produce a second product diffracted beam of light containing the product of the second two signals. The two product diffracted beams are rotated so that they are orthogonal to each other, and then combined. A time integrating photodetecting means is disposed in the path of the combined beam for generating a multi-product, time integrated, correlated output signal.

17 Claims, 14 Drawing Figures

MULTI-PRODUCT ACOUSTO-OPTIC TIME INTEGRATING CORRELATOR

RIGHTS OF THE GOVERNMENT

The invention described herein may be manufactured, used or licensed by or for the government of the United States of America for governmental purposes without payment to us of any royalties thereon.

CROSS REFERENCE TO RELATED APPLICATIONS

Reference is made to an application entitled "Acousto-Optic Diffraction and Signal Mixing Device", Ser. No. 599,309 filed by the same inventors and on even date as this application.

BACKGROUND OF THE INVENTION

This invention relates generally to surface wave, acousto-optic multi-product correlators, and more particularly to two, three, and four product correlators which features the interference between two product diffracted beams from a single four-channel surface acoustic (SAW) delay line. This product diffracted beam results from the interaction between the incoming light beam and a product acoustic "wave" generated by two counterpropagating surface acoustic waves.

Current digital and microwave technology has made possible spread-spectrum and other wideband communications and radar systems for antijam and low probability of intercept protection. These systems present unique problems for which acousto-optics may provide solutions. The relative ease in applying multiple transducers to surface acoustic wave delay lines allows novel architectures for such signal processing functions as correlation or convolution. Where large processing gain is required, integration in time rather than space permits time-bandwidth products in excess of $10^6$. Coherent, interferometric schemes provide both time (e.g., time-difference-of-arrival) and frequency information simultaneously.

As is known, the correlation function serves many useful purposes in the processing of radar and communication signals. Specifically, it is most useful when attempting to extract weak signals from a noisy environment, such as radar return signals, and in the process of synchronizing a spread spectrum communications system.

The gain of a signal processing system is essentially proportional to the time-bandwidth product thereof, where time refers to the integration time, and this product is a figure of merit of a processor. The interaction time, which may be different than the integration time, is the specific time window which is being simultaneously integrated, and in general, it is desirable to maximize the interaction time as well as the time-bandwidth product.

One type of correlator which has been developed in recent years is the surface wave acousto-optic type device, exemplified in U.S. Pat. Nos. 4,110,016 4,139,277 and 4,124,280, which are incorporated herein by reference. In such a device high frequency acoustic waves having envelopes corresponding to the signals to be correlated are propagated down piezoelectric crystals such as lithium niobate while a laser beam is directed across the crystals. The acoustic waves of the signals to be correlated diffract the coherent light, and upon suitable detection, the correlation function of the two signals is obtained. One limitation of the above described device is that it is often limited to use with signals having durations which are shorter than the interaction time of the device. The reason for this limitation is that the correlation integration is performed over a limited spatial variable, such as the length of the crystal delay line.

In U.S. Pat. No. 4,326,778, entitled "Acousto-optic Time Integrating Correlator", incorporated herein by reference, an acousto-optic time integrating correlator having a relatively high time bandwidth product as well as a relatively long interaction time is disclosed. While being an improvement, it is limited when it is used as a cross-correlation signal detector, by any difference between the reference carrier frequency and the input signal carrier frequency. For example, it has been calculated that for a 30 ms integration time, the device is limited to processing signals which are separated by less than 200 Hz. However, it is frequently necessary to cross-correlate signals of greater frequency separation, for example, in a radar system where the return radar signal is Doppler-shifted by reflection off of a moving target.

In U.S. Pat. No. 4,421,388 Dec. 20, 1983, entitled "Acousto-optic Time Integrating Frequency Scanning Correlator", incorporated herein by reference, an acousto-optic time integrating two-dimensional frequency scanning correlator for cross-correlating signals which are separated in frequency is disclosed. In that application, two coherent light beams which are derived from the same laser are fed across respective Bragg cells, one cell having the signal $A(t)\cos w_A t$ propagating thereacross and the other cell having the signal $B(t)\cos w_B t$ propagating thereacross. The respective output beams are compressed in the x direction and expanded in the y direction and are made incident on an acousto-optical correlator device having chirp signals counter-propagating thereacross. The optical output is fed to a time-integrating photodiode array which provides an output signal corresponding to the cross-correlation of $A(t)$ and $B(t)$. In a further embodiment, the two Bragg cells are replaced by a single Bragg cell and beams having different polarizations are fed thereacross. In a still further embodiment, only a single crystal is used which has the $A(t)$ and $B(t)$ signals, as well as the chirp signals, counter-propagating thereacross. However, the architecture of the two-beam devices is very difficult to implement optically. The two-beam architecture has the two beams going in to the Bragg cell with four times the Bragg angle between them to insure that the left incoming input laser beam interacts primarily with the surface acoustic wave (SAW) produced by the left hand transducer to give an output beam and likewise the right incoming laser beam primarily interacts with the SAW generated by the right hand transducer to obtain a second output beam, i.e., two output beams that are essentially colinear are obtained. It is then necessary to do some spatial filtering.

In U.S. Pat. No. 4,426,134 Jan. 17, 1984, entitled "Three & Four Product Surface-Wave Acousto-Optic Time Integrating Correlators," incorporated by reference herein, a method and device that provides two-dimensional three and four product correlated signals is disclosed. In that application a laser beam is split and shaped into first and second sheet beams. The first beam is directed to a first acousto-optic medium where it is doubly diffracted by first and second signals. The second beam is directed to a second acousto-optic medium which is spatially rotated 90° relative to the first acousto-optic medium where the second sheet beam is either singly diffracted by a third signal or doubly diffracted by a third and a fourth signal. The diffracted sheet beams are shaped into square beams and combined, and the combined beam is directed to a photodiode array to be detected. However, the architecture of this two beam device is also very difficult to implement optically. The optical signals are subject to jitter resulting from the vibration of the individual optical elements. The combined signal presented to the photodiode array detector is of low intensity, resulting in an inefficient system.

SUMMARY OF THE INVENTION

Design changes involving the lithium niobate (LiNbO$_3$) surface acoustic wave (SAW) delay line used in the processor of the present invention have dramatically reduced the size and the complexity of the optical path of the correlator as well as increased its processing capabilities. The anisotropic acoustic properties of LiNbO$_3$ are incorporated to combine the functions of two SAW devices into one using an experimental transducer geometry. Coupled with the exploitation of an anomalous polarization sensitivity found in the acousto-optic interaction in LiNbO$_3$ the design changes have produced an improved multiple-product correlator.

In our design, the acoustic anisotropy of LiNbO$_3$ was employed to isolate co-propagating acoustic waves whose propagation vectors were shifted by approximately 4 degrees. In this manner, the two SAW devices required by the previous architectures are replaced by one.

Linearly polarized HeNe laser radiation is imaged onto a y-cut, z-propagating LiNbO$_3$ SAW delay line. The transducer geometry on the LiNbO$_3$ SAW line is such that the four transducers lie in the x-z plane, each rotated by twice the Bragg angle ($2\theta_B$) from the x axis. One set of transducers is rotated by $+2\theta_B$ from the x axis, the other is rotated by $-2\theta_B$ from the x axis. Here, $\theta_B$ is the Bragg angle for the average of the acoustic frequencies being propagated. These acoustic transducers launch Rayleigh waves which generate phase-gratings in the interaction region. From the multiple orders of diffraction present after the acousto-optic interaction, the product-diffracted off-axis components are selected by a spatial filter. These orders are interferometrically combined using a Koester's prism. The resultant optical filed is imaged onto a vidicon camera tube. The output of the detector will contain the cross product of the optical field multiplication and represents the correlation of the signals input to the SAW device.

The device processes signals to obtain a multi-product, time integrated, correlated output signal. A laser beam is expanded into a sheet beam. The sheet beam traverses an acousto-optic medium and between the ends of the medium and parallel to its surface. The acousto-optic medium has an axis and a planar surface extending between opposite first and second ends. First and third acoustic transducers are disposed at the first end of the acousto-optic medium; second and fourth acoustic transducers are disposed at the second end of the acousto-optic medium. First and third signals are supplied to the first and third acoustic transducers, respectively, for propagating the signals on the surface of the acousto-optic medium in the direction of the second end of the medium. Second and fourth signals are supplied to the second and fourth acoustic transducers, respectively, for propagating the signals on the surface of the acousto-optic medium in the direction of the first end of the medium. The first and second signals diffract the sheet beam to produce a first, product diffracted beam of light containing the product of the first signal with the second signal. The third and fourth signals diffract the sheet beam to produce a second product diffracted beam of light containing the product of the third signal with the fourth signal. The first and second product diffracted beams are rotated so that they are orthogonal to each other. The orthogonal beams are combined, and the combined beam is directed to a time integrating photodetecting means to generate a multi-product, time integrated, correlated output signal.

The device of the present invention can generate a two, three, or four product, time integrated, correlated output signal. To generate a two product, time integrated, correlated output signal, only two of the signals supplied to the acoustic transducers contain information to be processed. To generate a three product, time integrated, correlated output signal, only three of the signals supplied to the acoustic transducers contain information to be processed. To generate a four product, time integrated correlated output signal, all four of the signals supplied to the acoustic transducer contain information to be processed.

The acousto-optic medium of the present invention has an axis which extends between the first and second ends of the medium. This axis is defined to be the z-axis. The axis normal to the surface of the acousto-optic medium is defined to be the y-axis, and the axis normal to both the z-axis and the y-axis is defined to be the x-axis. In the preferred embodiments of the device, the first acoustic transducer is disposed at the first end of the medium at an angle relative to the x-axis which is equal to $+2\theta_B$, and the second acoustic transducer is disposed at the second end of the medium at an angle relative to the x-axis which is also equal to $+2\theta_B$. The third acoustic transducer is disposed at the first end of the medium at an angle relative to the x-axis which is equal to $-2\theta_B$, and the fourth acoustic transducer is disposed of the second end of the medium at an angle relative to the x-axis which is also equal to $-2\theta_B$. In each instance, $\theta_B$ is the Bragg angle of the acousto-optic medium, which is Y-Z lithium niobate.

The device of the present invention provides a time integrating photodetecting means for generating a multi-product, time integrated, correlated output signal from the combined beam. This means may comprise either a photodiode area array or a vidicon tube camera.

The device of the present invention provides a means for expanding the laser beam into a sheet beam. This may comprise an optical beam expander disposed in the path of the laser beam and a lens placed after the beam expander for forming the expanded beam into a sheet beam.

Also provided in the present invention are means for filtering undesired diffractions produced by the interaction of the sheet beam with the acousto-optic medium and the first, second, third and fourth signals. This comprises a first means for forming the two product diffracted beams into rectangular beams. A second means is provided for forming the rectangular beams into two sheet beams. The two sheet beams are orthogonal to the sheet beam directed across the surface of the acousto-optic medium. The two sheet beams are directed through a pair of slits, which produces first and second filtered product diffracted sheet beams. A third means is provided for transforming the first and second filtered product diffracted sheet beams back into rectangular beams.

The device of the present invention includes means for rotating the first and second product diffracted beams so that they are orthogonal to each other, and means to combine them. Two Dove prisms are used to rotate the beams: one Dove prism rotates one doubly diffracted beam +90°, and the other Dove prism rotates the second doubly diffracted beam −180°. The two orthogonal beams are combined using a Koester's prism. The rotation by 180° with the Dove prism is merely to maintain approximately equal path length to the beam rotated by 90°.

Also presented by the present invention is a method for processing signals to obtain a multi-product time integrated, correlated output signal. A laser beam is expanded into a sheet beam. The sheet beam is directed to an acousto-optic medium. The acousto-optic medium has an axis and a planar surface extending between opposite first and second ends. The sheet beam traverses the medium between the medium ends along and parallel to the medium. First and third signals are propagated on the planar surface of the acousto-optic medium toward the first end of the acousto-optic medium. Second and fourth signals are propagated on the planar surface of the acousto-optic medium toward the second end of the acousto-optic medium. The first and second signal diffract the sheet beam to produce a first, product diffracted beam of light; the second and fourth signals diffract the sheet beam to produce a second, product diffracted beam of light. The two beams of product diffracted light are rotated so that they are orthogonal to each other, and then they are combined. The combined beam is directed to a time integrating photodetector to produce a multi-product, time integrated, correlated output signal. This method may further comprise the step of filtering undesired diffractions produced by the interaction of the sheet beam with the acousto-optic medium and the first, second, third and fourth signals.

A method is also presented of obtaining a two-dimensional four product correlation by processing spread spectrum radar signals. A laser beam is expanded and shaped into a sheet beam. The sheet beam is directed to an acousto-optic medium. The acousto-optic medium has an axis and a planar surface extending between opposite first and second ends. The sheet beam traverses the medium between the medium ends along and parallel to the medium. A radar signal transmitted by a radar signal is sampled, and the sampled signal is propagated on the planar surface of the acousto-optic medium toward the first end of the acousto-optic medium. The portion of the transmitted radar signal reflected from a target is received and propagated on the planar surface of the acousto-optic medium toward the second end of the acousto-optic medium. A first linear FM chirp signal is propagated on the planar surface of the acousto-optic medium toward the first end of the acousto-optic medium. A second linear FM chirp signal is propagated on the planar surface of the acousto-optic medium toward the second end of the acousto-optic medium. The sampled transmitted radar signal and the reflected signal diffract the sheet beam producing a first, product diffracted beam of light. The first linear FM chirp signal and the second linear FM chirp signal diffract the sheet beam producing a second, product diffracted beam of light. The first and second product diffracted beams of light are rotated so that they are orthogonal to each other, and then they are combined. The combined beam is directed to a time integrating photodetector to produce a two dimensional, time integrated, four product, correlated output signal.

OBJECTS OF THE INVENTION

It is an object of this invention to provide a method and an apparatus for processing spread-spectrum and other wideband communications and radar signals utilizing two, three, and four product surface wave, acousto-optic time integrating correlators.

It is another object of this invention to provide a method and an apparatus for processing spread-spectrum and other wideband communications and radar signals whose architecture is simple to implement optically.

It is still another object of this invention to provide a method and an apparatus for processing spread-spectrum and other wideband communications and radar signals which is not subject to jitter resulting from the vibration of the individual optical elements.

It is a further object of this invention to provide a method and an apparatus for processing spread-spectrum and other wideband communications and radar signals which presents a combined beam to the photodetector array which is of high intensity.

It is still a further object of this invention to provide an acousto-optic medium with four acoustic transducers disposed thereon.

A further object of this invention is to provide an acousto-optic medium which produces at least two product diffracted beams of light from a single input beam.

DESCRIPTION OF THE PREFERRED EMBODIMENTS

Figure 1:
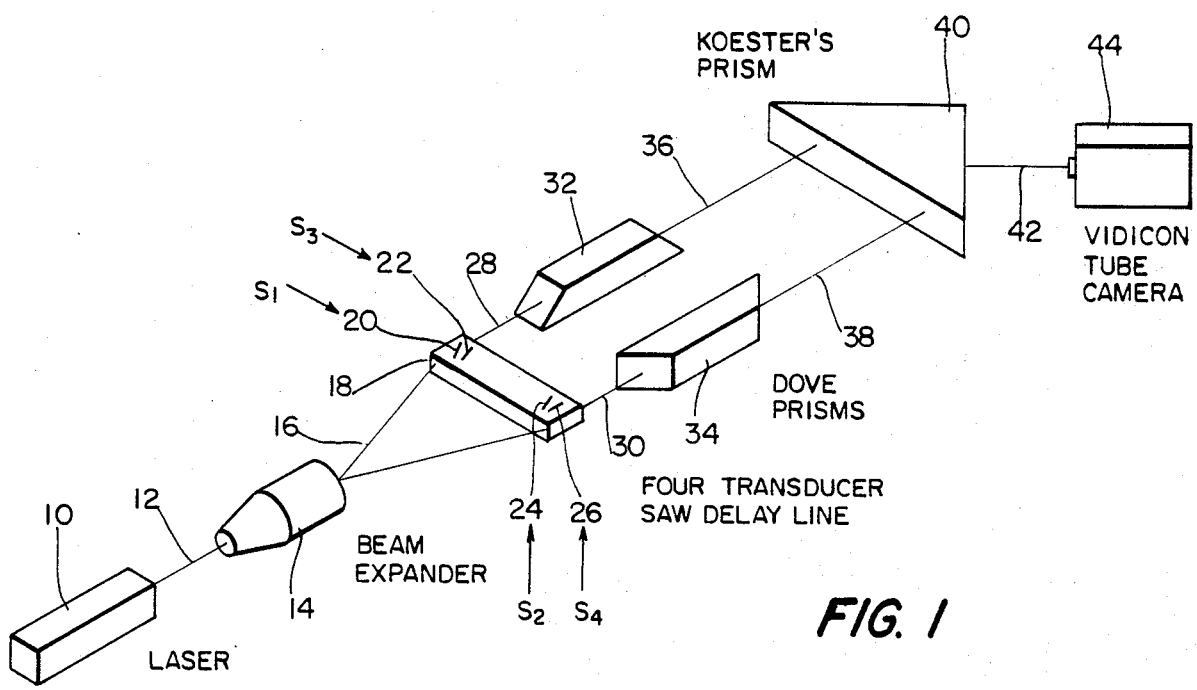
FIG. 1 is a schematic of the multi-product, acousto-optic, time-integrating correlator.

Referring now to the drawings, FIG. 1 is a schematic of the multi-product, acousto-optic, time integrating correlator. A laser 10 generates a single laser beam 12. Laser beam 12 is expanded by beam expander 14 into a sheet beam 16. The sheet beam 16 is directed across the surface of an acousto-optic medium 18. Acousto-optic medium 18 has acoustic transducers 20 and 22 disposed on the surface thereof at its first end; and acoustic transducers 24 and 26 disposed on the surface thereof at its second end. Signals $S_1$ and $S_3$ are supplied to acoustic transducers 20 and 22, respectively, for propagating them on the surface of the acousto-optic medium 18 in the direction of the second end of the acousto-optic medium. Signals $S_2$ and $S_4$ are supplied to acoustic transducers 24 and 26, respectively, for propagating them on the surface of the acousto-optic medium 18 in the direction of the first end of the acousto-optic medium. The signals $S_1$ and $S_2$ interact with sheet beam 16 causing a diffraction of sheet beam 16 and producing a first product diffracted beam 28 containing the product of $S_1$ with $S_2$. The signals $S_3$ and $S_4$ interact with sheet beam 16 causing a diffraction of sheet beam 16 and producing a second product diffracted beam 30 containing the product of $S_3$ with $S_4$. Beams 28 and 30 are rotated by Dove prisms 32 and 34, respectively, so that they are orthogonal, mutually perpendicular, to each other. Orthogonal beams 36 and 38 are combined by means of a Koester's prism 40, and the combined beam 42 is directed to a vidicon tube camera 44 or to a photodiode area array for detection.

Figure 2:
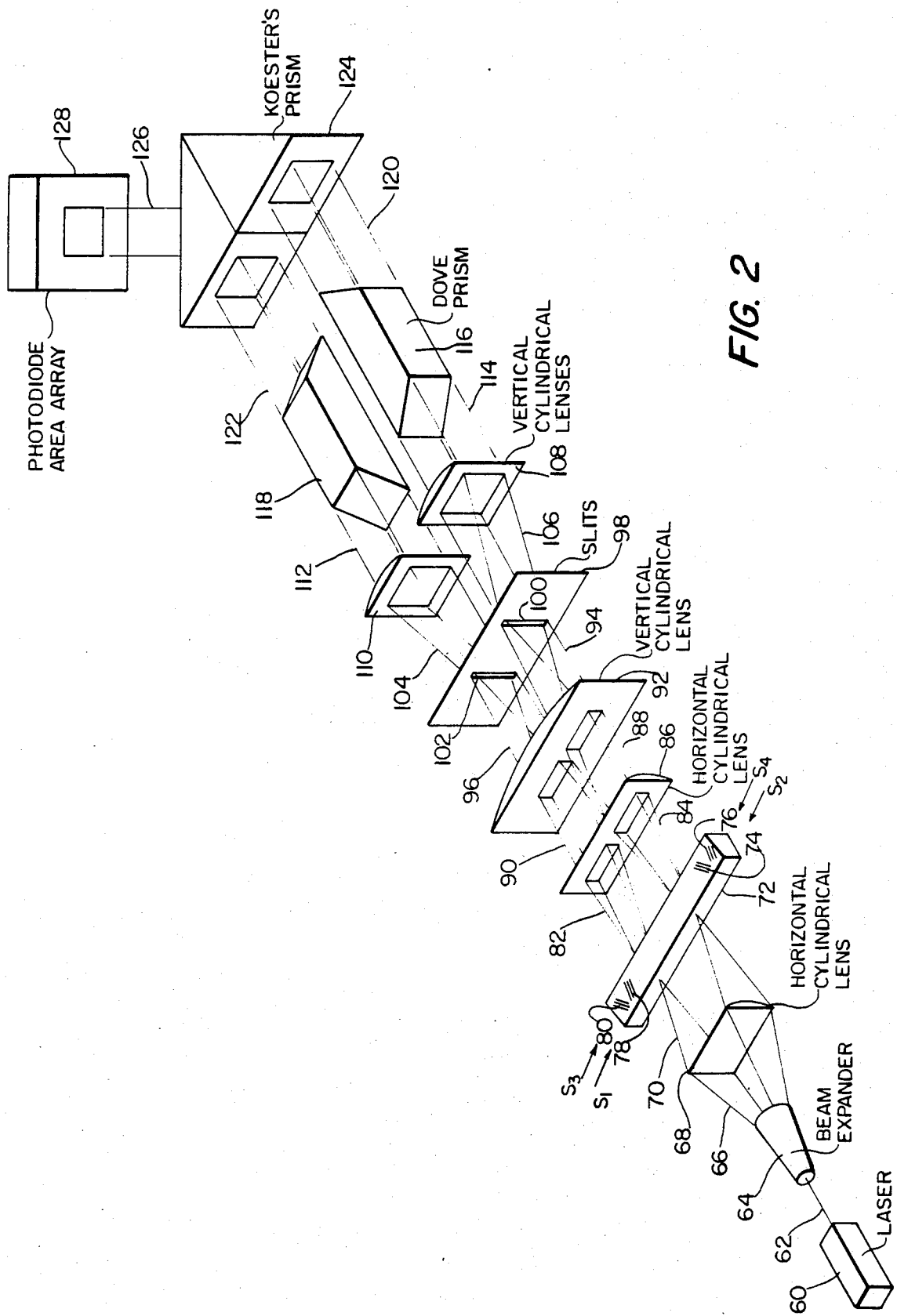
FIG. 2 is a schematic of a second embodiment of the multi-product, acousto-optic, time-integrating correlator.

FIG. 2 is a schematic of a second embodiment of the multi-product, acousto-optic, time-integrating correlator. A laser 60 generates a single laser beam 62. Laser beam 62 is expanded by beam expander 64 to produce expanded beam 66. Expanded beam 66 is directed to horizontal cylindrical lens 68 transforming it into a sheet beam 70. The sheet beam 70 is directed across the surface of an acousto-optic medium 72. Acousto-optic medium 72 has acoustic transducers 78 and 80 disposed on the surface thereof at its first end; and acoustic transducers 74 and 76 disposed on the surface thereof at its second end. Signals $S_1$ and $S_3$ are supplied to acoustic transducers 78 and 80, respectively, for propagating them on the surface of the acousto-optic medium 72 in the direction of the second end of the acousto-optic medium. Signals $S_2$ and $S_4$ are supplied to acoustic transducers 74 and 76, respectively, for propagating them on the surface of the acousto-optic medium 72 in the direction of the first end of the acousto-optic medium. The signals $S_1$ and $S_2$ interact with sheet beam 70 causing a diffraction of sheet beam 70 and producing a first product diffracted beam 82 containing the product of $S_1$ with $S_2$. The signals $S_3$ and $S_4$ interact with sheet beam 70 causing a diffraction of sheet beam 70 and producing a second product diffracted beam 84 containing the product of $S_3$ with $S_4$.

The beams 82 and 84 are directed to horizontal cylindrical lens 86 transforming it into rectangular beams 90 and 88, respectively. Rectangular beams 90 and 88 are directed to vertical cylindrical lens 92 transforming them into vertical sheet beams 96 and 94, respectively. Beams 96 and 94 are directed to slits 102 and 100 in plate 98. The purpose of slits 102 and 100 is to pass or to filter out only the desired product diffractions. After beams 96 and 94 have traversed slits 102 and 100, they emerge as vertical sheet beams 104 and 106. The vertical sheet beams 104 and 106 are directed to vertical cylindrical lenses 110 and 108, respectively, transforming them into rectangular beams 112 and 114. Rectangular beams 112 and 114 are rotated by Dove prisms 118 and 116, respectively, so that they are orthogonal to each other. Orthogonal beams 120 and 122 are combined by means of a Koester's prism 124, and the combined beam 126 is directed to a photodiode area array 128 or to a vidicon tube camera for detection.

Figure 3:
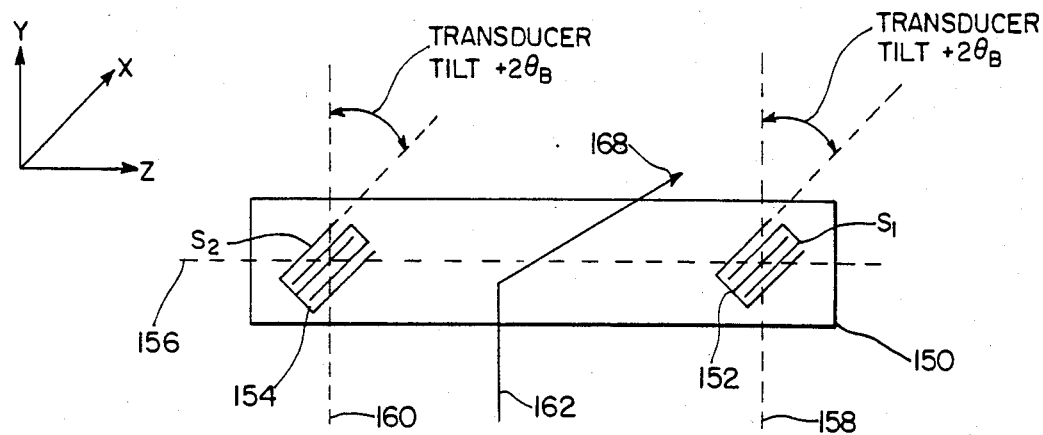
FIG. 3 illustrates an acousto-optic medium with two acoustic transducers disposed thereon.

Referring now to FIG. 3, there is shown an acousto-optic medium 150 with two acoustic transducers 152 and 154 disposed thereon. The acoustic transducer 152 is tilted with respect to the axis 158 by an angle $+2\theta_B$, where $\theta_B$ is the Bragg angle in the acousto-optic medium. The acoustic transducer 154 is titled with respect to the axis 160 by an angle $+2\theta_B$, where $\theta_B$ is the Bragg angle in the acousto-optic medium. In the drawing, axis 156 represents the z-axis, and axes 158 and 160 represent the x-axis. A signal $S_1$ is supplied to acoustic transducer 152 causing the signal to propagate towards the opposite end of the medium. A signal $S_2$ is supplied to acoustic transducer 154 causing the signal to propagate towards the opposite end of the medium. Product diffracted beam 168 now emerges from the acousto-optic medium 150. The product diffracted beam 168 contains the product of $S_1$ with $S_2$.

Figure 4:
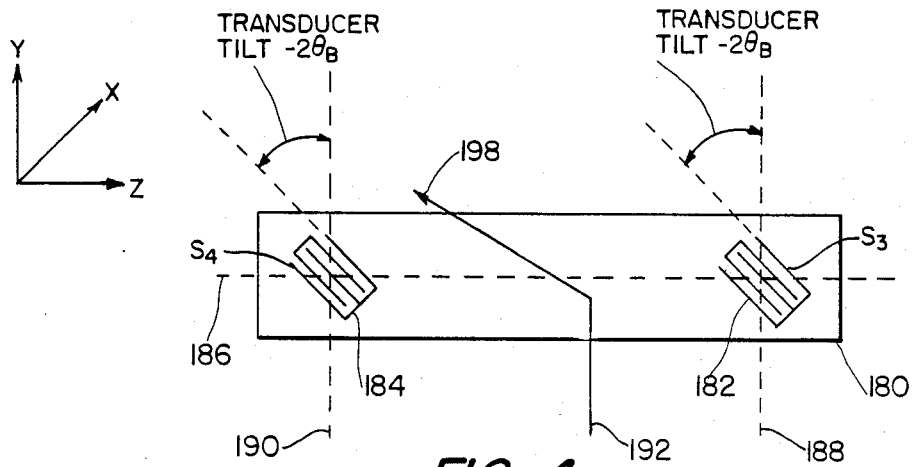
FIG. 4 illustrates an acousto-optic medium with two acoustic transducers disposed thereon.

Referring now to FIG. 4, there is shown an acousto-optic medium 180 with two acoustic transducers 182 and 184 disposed thereon. The acoustic transducer 182 is tilted with respect to the axis 188 by an angle $-2\theta_B$, where $\theta_B$ is the Bragg angle in the acousto-optic medium. The acousto-optic transducer 184 is tilted with respect to the axis 190 by an angle $-2\theta_B$, where $\theta_B$ is the Bragg angle in the acousto-optic medium. In the drawing, axis 186 represents the z-axis, and axes 188 and 190 represent the x-axis. A signal $S_3$ is supplied to acoustic transducer 182 causing the signal to propagate towards the opposite end of the medium. A signal $S_4$ is supplied to acoustic transducer 184 causing the signal to propagate towards the opposite end of the medium. Product diffracted beam 198 now emerges from the acousto-optic medium 180. The product diffracted beam 198 contains the product of $S_3$ with $S_4$.

Figure 5:
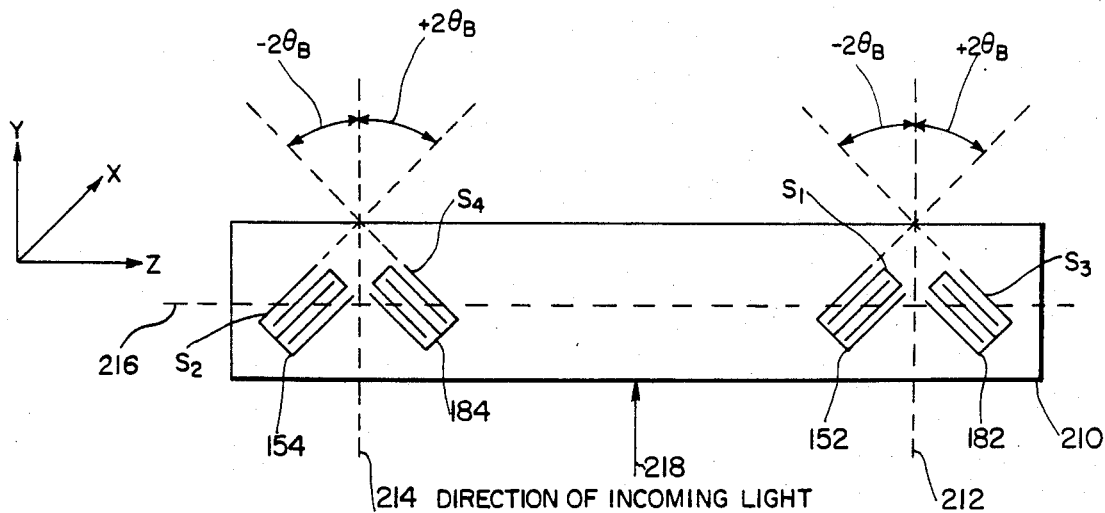
FIG. 5 illustrates an acousto-optic medium with four acoustic transducers disposed thereon.

Acoustic transducers 152, 154, 182 and 184 may be placed on a single acousto-optic medium 210, as shown in FIG. 5. Transducers 152 and 154 are tilted with respect to axes 212 and 214 by an angle $+2\theta_B$, where $\theta_B$ is the Bragg angle in the acousto-optic medium. Transducers 182 and 184 are tilted with respect to axes 212 and 214 by an angle $-2\theta_B$, where $\theta_B$ is the Bragg angle in the acousto-optic medium. In the drawing, axis 216 represents the z-axis, and axes 212 and 214 represent the x-axis. Signals $S_1$ and $S_3$ are supplied to acoustic transducers 152 and 182, respectively, causing the signals to propagate towards the opposite end of the medium. Signals $S_2$ and $S_4$ are supplied to acoustic transducers 154 and 184, respectively causing the signals to propagate towards the opposite end of the medium. Signals $S_1$ and $S_2$ produce a first product diffracted beam. Signals $S_3$ and $S_4$ produce a second produce diffracted beam. The first product diffracted beam contains the product of $S_1$ with $S_2$, and the second product diffracted beam contains the product of $S_3$ with $S_4$.

Figure 6:
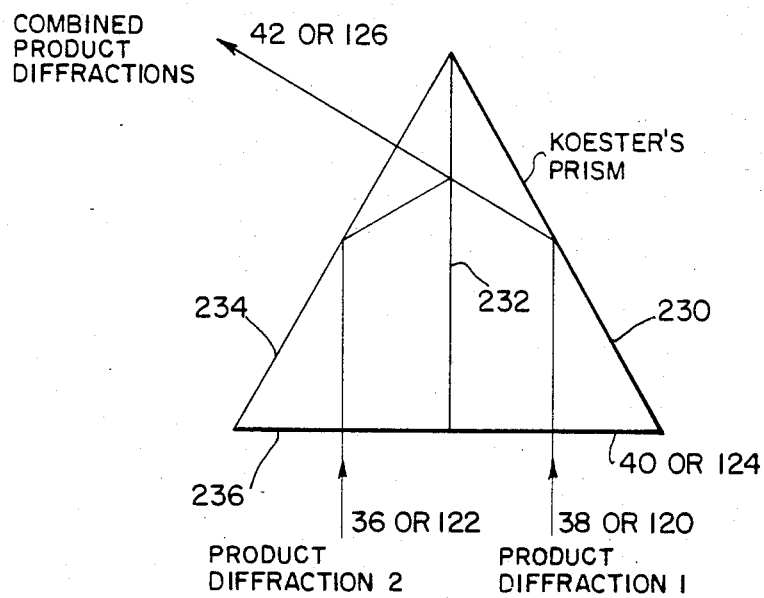
FIG. 6 is a schematic of the paths that the orthogonal beams follow in the Koester's prism.

Referring now to FIG. 6, there is shown the paths that orthogonal beams 36 and 38, or orthogonal beams 120 and 122, follow in the Koester's prism 40 or 124. The beams are viewed in the prism from either its top or bottom triangular surface. The first orthogonal, product diffracted beam 38 or 120 enters the Koester's prism 40 or 124 though face 236 of the prism. Beam 38 or 120 is reflected by face 230 of the prism, passes through semi-reflecting face 232, and exits the prism through face 234. The second orthogonal, product diffracted beam 36 or 122 enters the Koester's prism 40 or 124 though face 236 of the prism, and reflects off of face 234 toward semi-reflecting face 232. Beam 36 or 122 combines with beam 38 or 120 at the semi-reflecting face 232 and exits the Koester's prism through face 234 as combined, product diffracted beam 42 or 126.

In FIGS. 3, 4, and 5, an operational coordinate system for this analysis is defined for the $LiNbO_3$ SAW delay line. The z-axis corresponds to the acoustic propagation direction (on the information bearing axis), the y-axis is perpendicular to the top face of the one, and the x-axis is perpendicular to the front face of the device. In the preferred embodiment of the acousto-optic multiple-product correlator, HeNe laser radiation is expanded to a 7.6 cm truncated Gaussian intensity profile beam and apertured to a square 3.2 mm on a side. Let equation 1 represent the apertured beam:

$$L(y,x,t) = A(z,y)\, G(z,y,t) \exp\left[ i\left( w_l t - \frac{w_l x}{u} + \delta_l(t) \right) \right] \quad (1)$$

where $A(z,y)$ represents the square aperture, $G(z,y,t)$ represents the Gaussian intensity distribution, u is the velocity of sound in the material, $\delta_l(t)$ is the signal delay, and $w_l$ is the optical frequency. This apertured Gaussian beam is then compressed in the y dimension by a cylindrical lens to form a sheet beam for increased interaction efficiency. For this analysis we will ignore this operation and its inverse since they operate only in a dimension orthogonal to the information-bearing axis. We then can consider equation 1 to be the form of the optical field interacting with $LiNbO_3$.

The signals to be correlated set up a multiple-component phase grating which propagates along the z-axis of the $LiNbO_3$. The components launched on the $LiNbO_3$ SAW device are $$S_i(z,t) = M_i(t \pm z/u) \exp\left[ i\left( w_i\left( t - \frac{z\sin\theta}{(u)} \right) + \delta_i(t) \right) \right] \quad (2)$$
$$i = 1,2,3,4$$

In equation 2, $w_1$ through $w_4$ represent the carrier frequencies and $\delta_1(t)$ through $\delta_4(t)$ represent the phase information on these carriers. The term $M_i(t\mp z/u)$ are amplitude modulation factors for signals 1, 2, 3, and 4 where i is 1, 2, 3, or 4 and z/u is positive or negative based on the direction of the signal 1, 2, 3, or 4.

After the interaction with this phase grating in the $LiNbO_3$, the optical field consists of multiple diffracted orders and an undiffracted fraction. Appropriate choice of Bragg angle ($\theta$ in Equation 2) and spatial filtering eliminate all but two orders of interest given by equations 3 and 4 below.

$$D_1(y,z,t) = AGM_1M_2\cos\left[ (w_l + w_1 - w_2)t + \frac{w_l x}{c} - \left( \frac{w_1 + w_2}{(u)} \right) z\sin\theta + \delta_l + \delta_1 - \delta_2 \right] \quad (3)$$

$$D_2(y,z,t) = AGM_3M_4\cos\left[ (w_l - w_3 + w_4)t = \frac{w_l x}{c} - \left( \frac{w_3 + w_4}{(u)} \right) z\sin\theta + \delta_l - \delta_3 + \delta_4 \right] \quad (4)$$

These orders consist of Doppler shifted optical fields propagating at twice the Bragg angle from the original beam. The order $D_1(y,z,t)$ is shifted by interacting with the grating component at frequency $w_1-w_2$. Likewise, the order $D_2(y,z,t)$ is shifted by interacting with the grating component at $w_4-w_3$. Since the fields are rotated spatially using the Dove prisms, the images they form create a two-dimensional space. To further simplify the analysis, we compress the amplitude information into one function. Equations 5 and 6 represent the field after it has passed through the Dove prisms:

$$D_1(y,z,t) = A^*(y,z,t)\cos\left[ (w_l + w_1 - w_2)t + \frac{w_l x}{c} - \left( \frac{w_1 + w_2}{(u)} \right) z\sin\theta - \delta_l + \delta_1 - \delta_2 \right] \quad (5)$$

$$D_2(y,z,t) = B^*(y,z,t)\cos\left[ (w_l - w_3 + w_4)t + \frac{w_l x}{c} - \left( \frac{w_3 + w_4}{(u)} \right) y\sin\theta + \delta_l - \delta_3 + \delta_4 \right] \quad (6)$$

These orders are then added constructively by a Koester's prism, and the resultant optical field imaged onto a square-law detection device (in the preferred embodiment, a vidicon camera is used) which produces an output at the cross-term RF frequency given by:

$$V(y,z,t) = \int_t A^* B^* \left[ \cos\left[ (w_l + w_1 - w_2)t - \frac{w_l x}{c} - \left( \frac{w_1 + w_2}{(u)} \right) z\sin\theta + \cos(w_l - w_3 + w_4)t + \frac{w_l x}{c} - \left( \frac{w_3 + w_4}{(u)} \right) y\sin\theta + \delta \right] \right]^2 dt. \quad (7)$$

In the multiple-product time-integrating correlator, certain matching conditions are appropriate, which simplify the above expression to $$V(y,z,t) = \int_t A^* B^* \cos\left[\left(\frac{w_1 + w_2}{(u)}\right) \sin\theta(z - y) + \delta\right] dt. \tag{8}$$

Recalling the substitutions made for the amplitude functions, we can see that this is the correlation in two dimensions of the four signals represented in equation 2 at the RF frequency $(w_1 + w_2)$ $$V(y,z,t) = \tag{9}$$

$$\int_t A^2 G^2 M_1 M_3 M_4 \cos\left[\left(\frac{w_1 + w_2}{(u)}\right) \sin\theta(z - y) + \delta\right] dt$$

the LiNbO$_3$. This increase can be attributed to the angle insensitivity demonstrated by the P polarization acousto-optic interaction in LiNbO$_3$. The frequency response of the interdigital inverted-pair transducers is responsible for the approximately 2 dB ripple in the diffraction efficiency.

Figure 10:
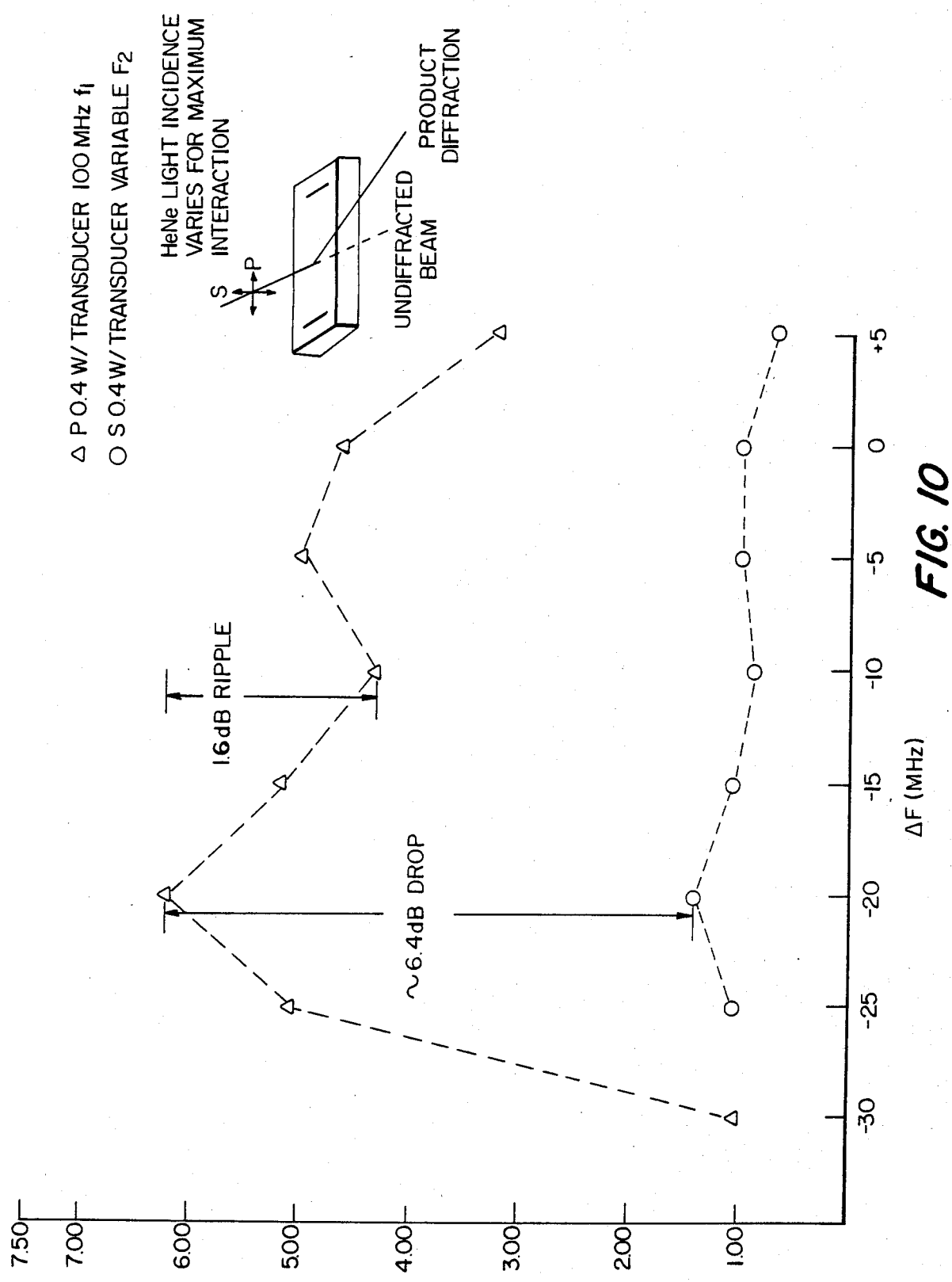
FIG. 10 is a graph of product diffraction efficiency versus acoustic power.

Measurements made to confirm the approximate linear dependence of diffraction efficiency to acoustic power (valid for low acoustic power) indicate a similar increase in diffraction efficiency when using P polarized light. A test using a GaAs laser diode (wavelength 830 nm) bears out the P polarization efficiency increase. FIG. 10 summarizes these results.

Figure 11:
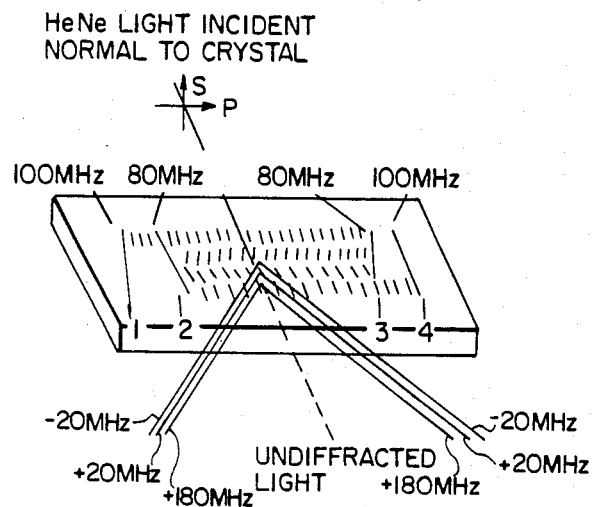
FIG. 11 is a schematic of the results of acoustic isolation measurements.

Results of acoustic isolation measurements are summarized in FIG. 11 and in Table I.

TABLE I

| | PRODUCT DIFFRACTION AND CROSSTALK | | | |
|---|---|---|---|---|
| | ACTIVE TRANSDUCERS | PRODUCT DIFFRACTION FREQUENCY (MHz) | VERTICAL POLARIZATION (S) | HORIZONTAL POLARIZATION (P) |
| PRODUCT DIFFRACTION IN BRAGG DIRECTION | 13 | +20 | 52 | 41 |
| | 24 | +20 | 48 | 43 |
| PRODUCT DIFFRACTION OPPOSITE TO BRAGG DIRECTION | 13 | −20 | 90 | 80 |
| | 24 | −20 | 88 | 78 |
| CROSSTALK | 12 | +180 | 72 | 60 |
| | 34 | +180 | 75 | 58 |

Figure 7:
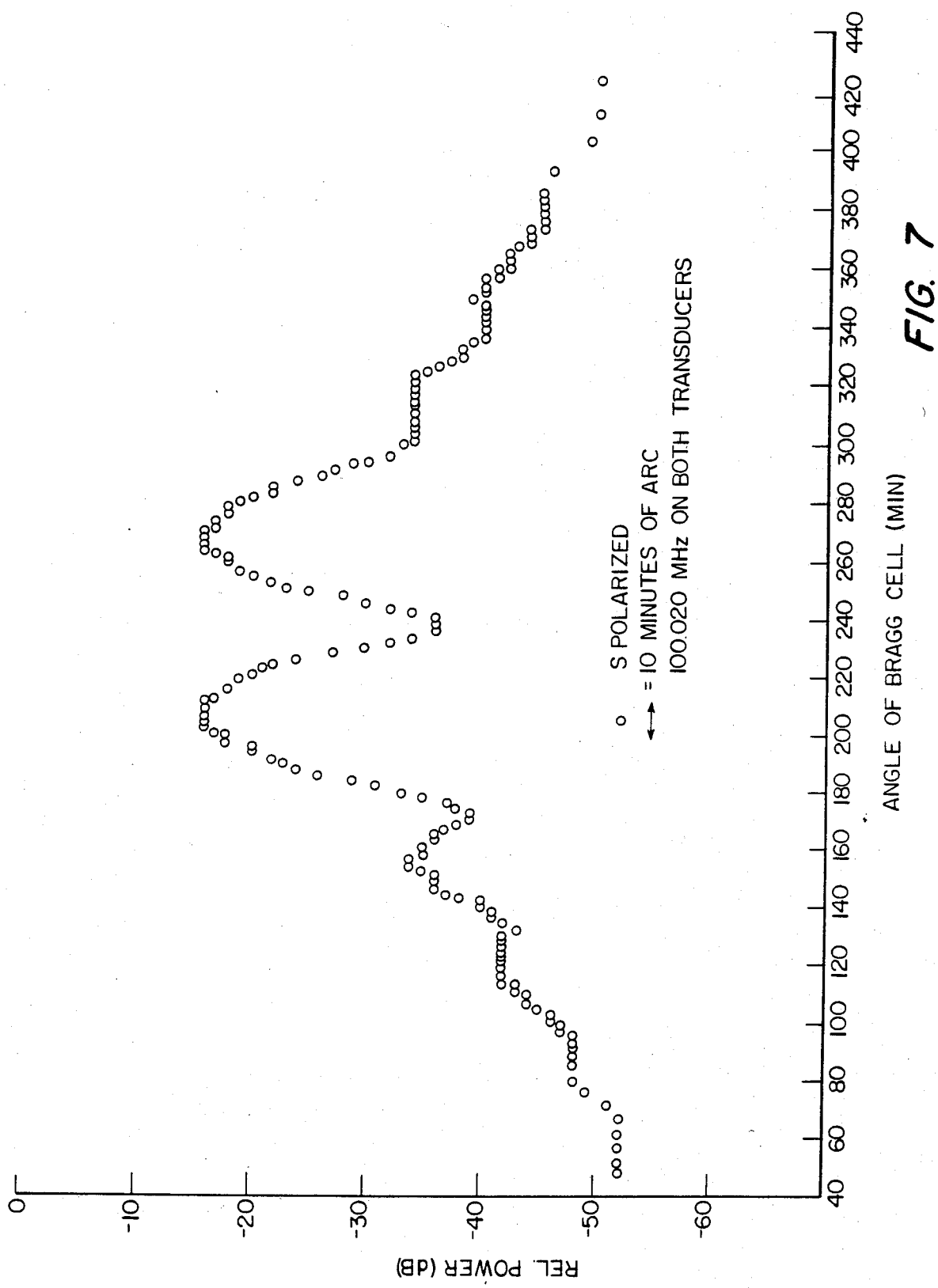
FIG. 7 is a graph of the test results for input light S polarized.
Figure 8:
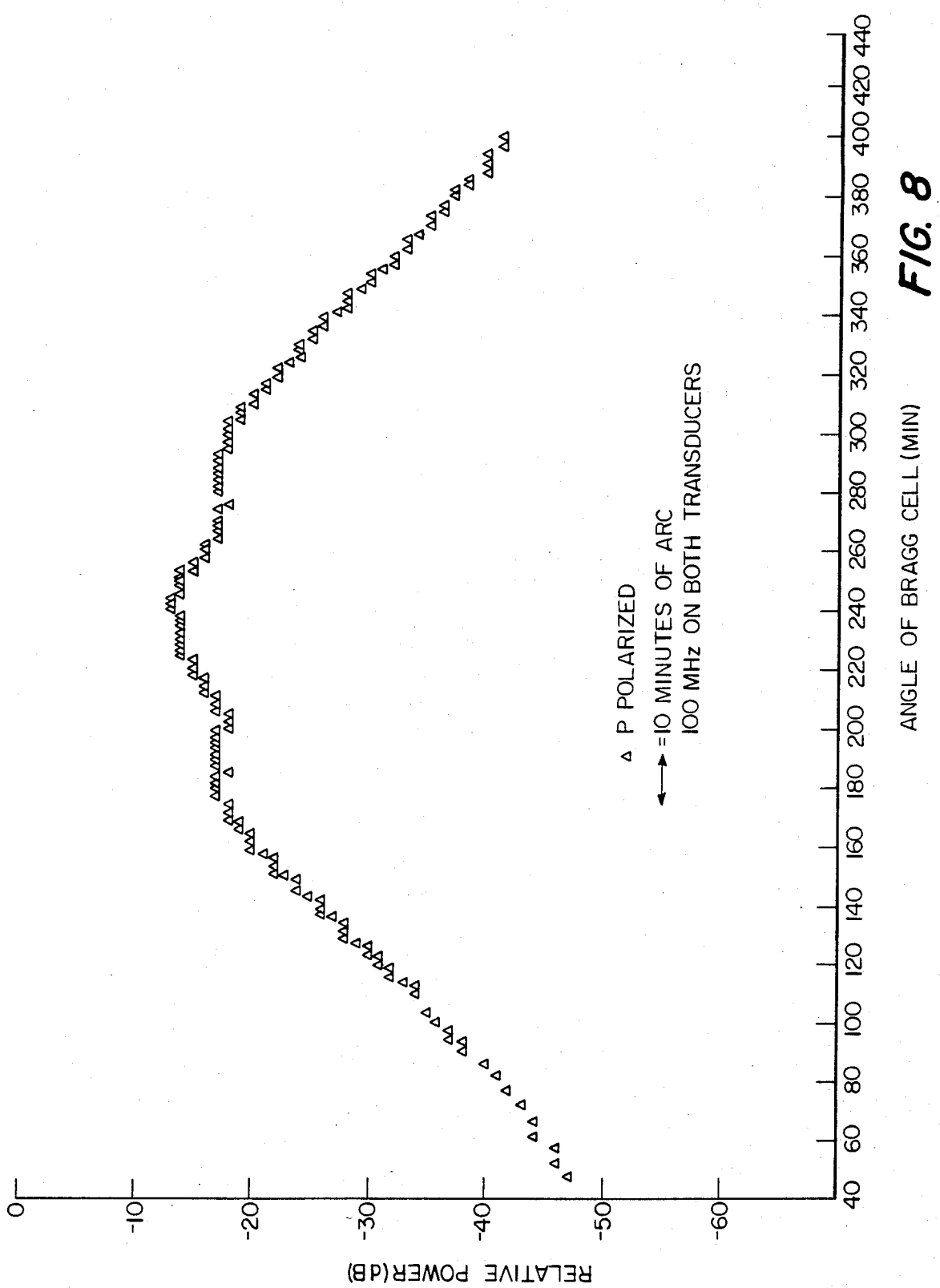
FIG. 8 is a graph of the test results for input light P polarized.

The unique transducer geometry of the prototype was characterized for performance in terms of diffraction efficiency, interaction bandwidth, and isolation of multiple co-propagating and counter-propagating acoustic waves. During the performance tests, experiments were conducted using light linearly polarized parallel to the z-axis of the SAW line (P polarized) and parallel to the y-axis of the SAW line (S polarized) in order to probe the interaction of polarization sensitivity. In the experiments involving interaction bandwidth, a heterodyne detection method was used in which a product diffracted order parallel and approximately collinear with the undiffracted fraction was added coherently to the zero-order beam on a PIN photodiode. Results are summarized in FIGS. 7 and 8. For input light S polarized the familiar sinc$^2$(x) interaction profile was observed; however, using input light P polarized, this sinc$^2$(x) dependence characteristic of the Bragg interaction disappears. The central broad peak of FIG. 8 shows the P polarized light interaction to be broadband, that is, less sensitive to angle of incidence; this is a feature more associated with the Raman-Nath regime. The conventional description of the interaction, $Q = 2\pi W\lambda/n\lambda_a$ indicates that the Bragg mode should still dominate. In all experiments, Q ranged between 8 and 15; the value for Q in the interaction summarized in FIG. 8 was 14.8. This anomalous polarization sensitivity can be exploited in the acousto-optic two-dimensional time-integrating correlator.

Figure 9:
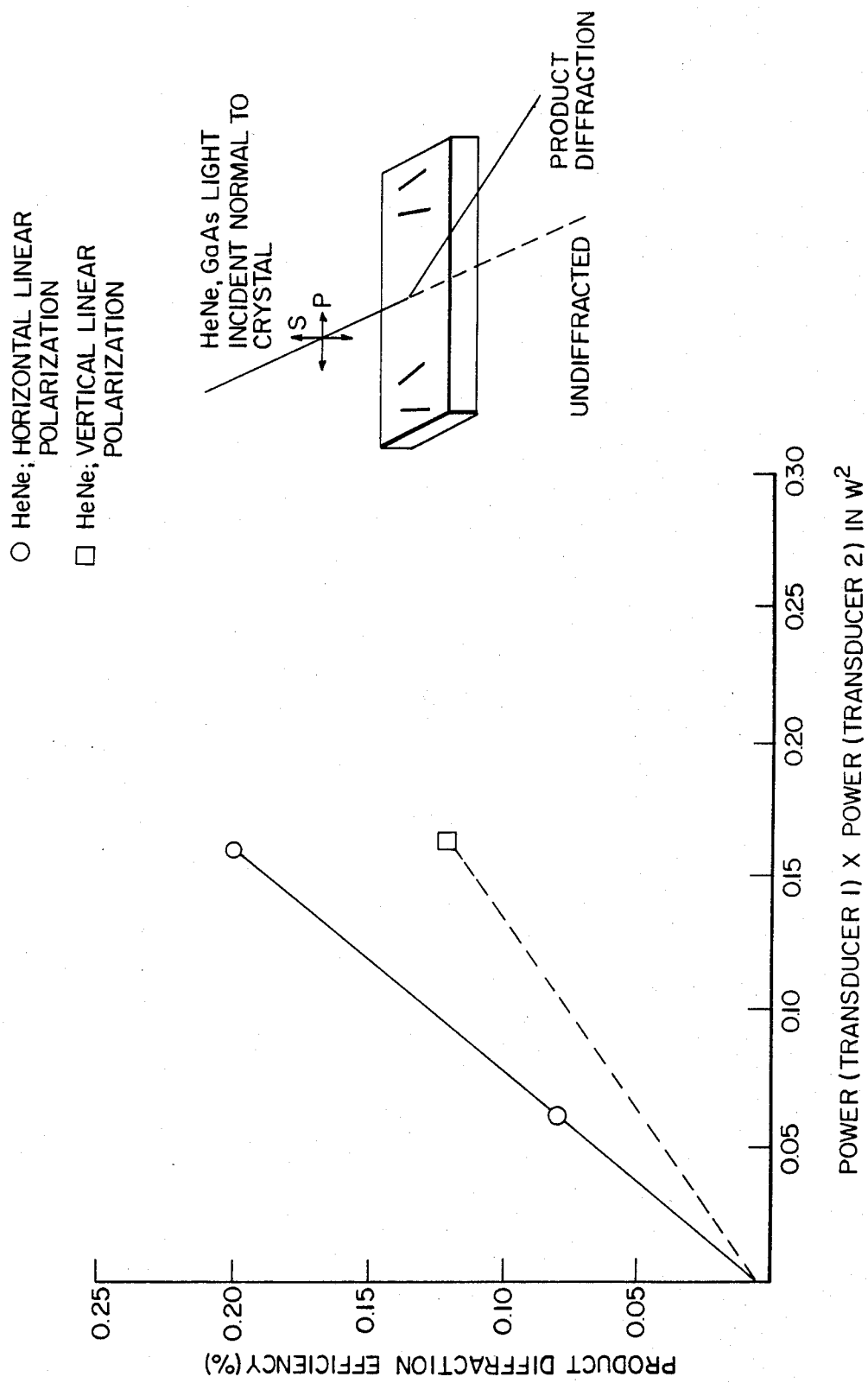
FIG. 9 is a graph of the test results in which the Bragg angle sensitivity was measured across the transducer bandwidth. The additional figure shows the experimental setup for the performance test described in the specification. It shows laser light incident normal to a X-Y lithium niobate crystal having surface acoustic wave transducers disposed on its surface. The laser light is linearly polarized parallel to the z-axis of the SAW line (P polarized) and parallel to the y-axis of the SAW line (S polarized.)

For the two-dimensional correlator design to achieve maximum dynamic range, it is necessary to operate at lower light levels than found near the undiffracted fraction. Hence, the product-diffracted orders far from this fraction are used. FIG. 9 illustrates the results of a test in which the Bragg angle sensitivity was measured across the transducer bandwidth. Results show an increase in diffraction efficiency of up to 6 dB across the transducer bandwidth with light P polarized incident in It was proposed that P polarization bandwidth broadening would adversely affect the isolation of multiple signals on the LiNbO$_3$. A test was designed in which product-diffracted off-axis components were heterodyned with a fraction of the unmodulated light and detected on a PIN photodiode.

The information-bearing component of the product-diffracted orders measure 20±2 dB above the crosstalk between transducers. Leakage of product diffracted light due to non-Bragg mode interaction was measured to be 38±1 dB down from the information bearing component. It is evident therefore in both cases that the broadening of the interaction using P polarized light can reduce the usable bandwidth, although this reduction is small. Square-law heterodyne detection of these orders allows for a usable dynamic range of 40±6 dB above transducer crosstalk and 76±2 dB above leakage.

Figure 12:
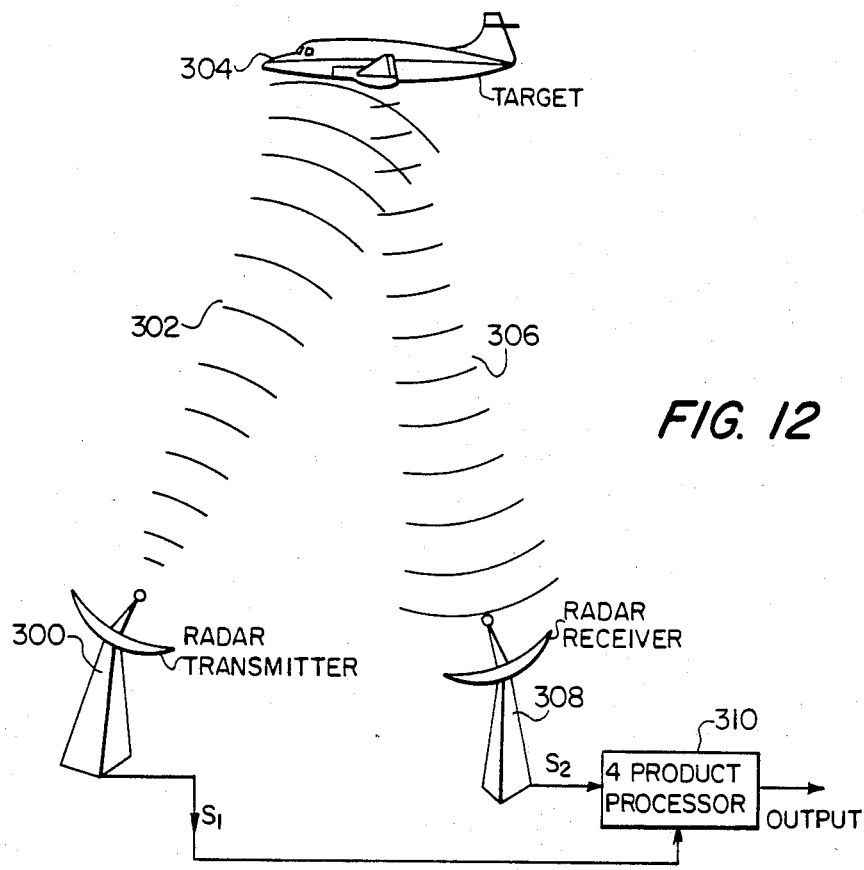
FIG. 12 is a representation of a radar system utilizing a four product correlator of the present invention.
Figure 13:
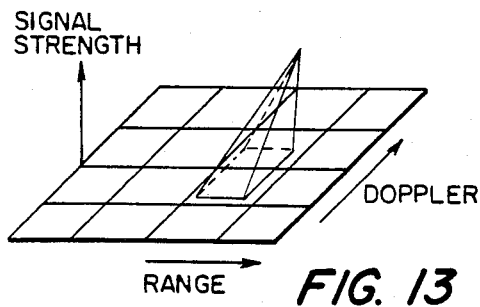
FIG. 13 is a graphical representation of the signal obtained from the radar system shown in FIG. 12.
Figure 14:
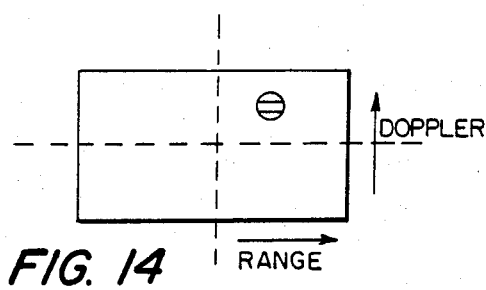
FIG. 14 is a graphical representation of the signal that would be seen on a vidicon derived from the radar system shown in FIG. 12.

FIGS. 12 and 13 illustrate a direct sequence spread-spectrum radar system using this four product correlator. A radar transmitter 300 transmits a radar signal, represented at 302, and a sample of the transmitted signal S$_1$ is relayed to a four product correlator of the present invention. The radar signal 302 is reflected from a target, represented at 304, and the reflected signal 306 is received by a receiver 308. This signal S$_2$ is relayed to the four product correlator 310 of the present invention. FIG. 13 graphically illustrates, in three dimensions, the output of the four product correlator. The tip of the pyramid represents the position of the target and has coordinates of signal strength, range and doppler. FIG. 14 is an illustration of how the output of the four product correlator 310 of the radar system would look on a vidicon display. Correlation of the direct sequence code in the horizontal dimension provides range information, and doppler compensation in the vertical dimension provides velocity data. The output, shown in FIG. 14, represents a situation in which $\Delta$hd H and $\Delta_V$ are non-zero. The terms $\Delta$h and $\Delta$v are spatial phase terms describing the interference pattern of the combination of the two beams combined by the Koesters prism. Where the two beams are collinear, the spatial phase pattern is uniform; where the two beams have some angle between them, a spatial fringe pattern results. This is represented by a phase term in the plane coordinates (here, y and z).

While the invention has been described with reference to the accompanying drawings, we do not wish to be limited to the details shown therein as obvious modifications may be made by one of ordinary skill in the art.

We claim:

1. A device for processing signals to obtain a multi-product, time integrated, correlated output signal, comprising:
   (a) means for producing a laser light beam;
   (b) means for expanding said laser light beam into a first sheet beam;
   (c) an acousto-optic medium having an axis and a planar surface extending between opposite first and second ends which is disposed in the path of said sheet beam such that the sheet beam traverses the medium between the medium ends along and parallel to the medium;
   (d) a first acoustic transducer, disposed at the first end of the acousto-optic medium;
   (e) a second acoustic transducer, disposed at the second end of the acousto-optic medium;
   (f) a third acoustic transducer, disposed at the first end of the acousto-optic medium;
   (g) a fourth acoustic transducer, disposed at the second end of the acousto-optic medium;
   (h) a first signal, supplied to said first acoustic transducer, for propagating said first signal on the surface of said acousto-optic medium in the direction of the second end of the acousto-optic medium;
   (i) a second signal, supplied to said second acoustic transducer, for propagating said second signal on the surface of said acousto-optic medium in the direction of the first end of the acousto-optic medium;
   (j) a third signal, supplied to said third acoustic transducer, for propagating said third signal on the surface of said acousto-optic medium in the direction of the first end of the acousto-optic medium;
   (k) a fourth signal, supplied to said fourth acoustic transducer, for propagating said fourth signal on the surface of said acousto-optic medium in the direction of the first end of the acousto-optic medium;
   (l) wherein said first and second signals diffract said sheet beam to produce a first, product diffracted beam of light, said first product diffracted beam containing the product of said first signal with said second signal;
   (m) wherein said third and fourth signals diffract said sheet beam to produce a second, product diffracted beam of light, said second product diffracted beam containing the product of said third signal with said second signal;
   (n) means for rotating said first product diffracted beam and said second product diffracted beam so that they are orthogonal to each other;
   (o) means to combine said orthogonal, product diffracted beams; and
   (p) time integrating photodetecting means disposed in the path of the combined beam for generating a multi-product, time integrated, correlated output signal.

2. The device of claim 1, wherein only two of said signals contain information to be processed; whereby the photodetecting means generates a two product, time integrated, correlated output signal.

3. The device of claim 1, wherein only three of said signals contain information to be processed; whereby the photodetecting means generates a three product, time integrated, correlated output signal.

4. The device of claim 1, wherein each of said signals contain information to be processed; whereby the photodetecting means generates a four product, time integrated, correlated output signal.

5. The device of claim 1, wherein:
   (a) said axis defines the z-axis, the axis normal to said surface defines the y-axis, and the axis normal to both the z-axis and the x-axis defines the x-axis;
   (b) said first acoustic transducer is disposed at an angle relative to the x-axis of the acousto-optic medium which is equal to $+2\theta_B$, where $\theta_B$ is the Bragg angle for the acousto-optic medium;
   (c) said second acoustic transducer is disposed at an angle relative to the x-axis of the acousto-optic medium which is equal to $+2\theta_B$, where $\theta_B$ is the Bragg angle for the acousto-optic medium;
   (d) said third acoustic transducer is disposed at an angle relative to the x-axis of the acousto-optic medium which is equal to $-2\theta_B$, where $\theta_B$ is the Bragg angle for the acousto-optic medium; and
   (e) said fourth acoustic transducer is disposed at an angle relative to the x-axis of the acousto-optic medium which is equal to $-2\theta_B$, where $\theta_B$ is the Bragg angle for the fourth signal in the acousto-optic medium.

6. The device of claim 1, wherein the time integrating photodetecting means comprises a photodiode area array.

7. The device of claim 1 wherein the time integrating photodetecting means comprises a vidicon tube camera.

8. The device of claim 1, wherein the acousto-optic medium comprises a surface acoustic wave device built on Y-Z lithium niobate.

9. The device of claim 1, wherein the means for expanding said laser beam into a sheet beam comprises:
   (a) a beam expander disposed in the path of said laser beam; and
   (b) a lens for forming the expanded beam into a sheet beam.

10. The device of claim 1, further comprising means for filtering undesired diffractions produced by the interaction of said sheet beam with said acousto-optic medium and said first, second, third, and fourth signals.

11. The device of claim 10, wherein said means for filtering comprises:
    (a) first means for forming said first and second product diffracted beams into first and second rectangular beams;
    (b) second means for forming said first and second rectangular beams into second and third sheet beams, said second and third sheet beams being orthogonal to the plane of said first sheet beam;
    (c) means to pass only the desired product diffractions within said second and third sheet beams to produce first and second filtered product diffracted sheet beams, said means comprising a pair of slits disposed in the path of said second and third sheet beams; and (d) third means for forming said first and second filtered product diffracted sheet beams into third and fourth rectangular beams.

12. The device of claim 1, wherein said means for rotating said first and second product diffracted beams comprises dove prisms.

13. The device of claim 1, wherein:
    (a) said first product diffracted beam is rotated +90°; and(
    (b) said second product diffracted beam is rotated −180°.

14. The device of claim 1, wherein said means to combine said orthogonal comprises a Koester's prism.

15. A method for processing signals to obtain a multi-product, time integrated, correlated output signal, comprising the steps of:
    (a) expanding a laser light beam into a sheet beam;
    (b) directing said sheet beam to an acousto-optic medium having an axis and a planar surface extending between opposite first and second ends, so that the sheet beam traverses the medium between the medium ends along and parallel to the medium;
    (c) propagating a first signal on the planar surface of the acousto-optic medium toward the first end of the acousto-optic medium;
    (d) propagating a second signal on the planar surface of the acousto-optic medium toward the second end of the acousto-optic medium;
    (e) propagating a third signal on the planar surface of the acousto-optic medium toward the first end of the acousto-optic medium;
    (f) propagating a fourth signal on the planar surface of the acousto-optic medium toward the second end of the acousto-optic medium;
    (g) wherein said first and second signals diffract said sheet beam producing a first, product diffracted beam of light;
    (h) wherein said third and fourth signals diffract said sheet beam producing a second, product diffracted beam of light;
    (i) rotating said first product diffracted beam and said second product diffracted beam so that they are orthogonal to each other;
    (j) combining said orthogonal, product diffracted beams; and
    (k) directing the combined beam to a time integrating photodetector.

16. The method of claim 15, further comprising the step of filtering undesired diffractions produced by the interaction of said sheet beam with said acousto-optic medium and said first, second, third, and fourth signals.

17. A method of obtaining a two-dimensional four product correlation by processing spread spectrum radar signals comprising the steps of:
    (a) expanding a laser light beam into a sheet beam;
    (b) directing said sheet beam to an acousto-optic medium having an axis and a planar surface extending between opposite first and second ends, so that the sheet beam traverses the medium between the medium ends along and parallel to the medium;
    (c) sampling a transmitted radar signal transmitted by a radar transmitter;
    (d) propagating the sampled transmitted radar signal on the planar surface of the acousto-optic medium toward the first end of the acousto-optic medium;
    (e) receiving a reflected signal portion of the transmitted radar signal reflected from a target;
    (f) propagating the reflected signal on the planar surface of the acousto-optic medium toward the second end of the acousto-optic medium;
    (g) propagating a first linear FM chirp signal on the planar surface of the acousto-optic medium toward the first end of the acousto-optic medium;
    (h) propagating a second linear FM chirp signal on the planar surface of the acousto-optic medium toward the second end of the acousto-optic medium;
    (i) wherein said sampled transmitted radar signal and said received reflected signal diffract said sheet beam producing a first, product diffracted beam of light;
    (j) wherein said first linear FM chirp signal and said second linear FM chirp signal diffract said sheet beam producing a second, product diffracted beam of light;
    (k) rotating said first product diffracted beam and said second product diffracted beam so that they are orthogonal to each other;
    (l) combining said orthogonal, product diffracted beams; and
    (m) directing the combined beams to a time integrating photodetector.

* * * * *